United States Patent [19]
Ono et al.

[11] Patent Number: 5,290,347
[45] Date of Patent: Mar. 1, 1994

[54] SALT-FORMING TYPE DYE, AND ITS CONCENTRATED SOLUTION COMPOSITION AND INK COMPOSITION

[75] Inventors: Takashi Ono, Takatsuki; Tatsuya Yagyu, Neyagawa; Katsumi Fukuda, Osaka, all of Japan

[73] Assignee: Orient Chemical Industries, Ltd., Osaka, Japan

[21] Appl. No.: 866,217

[22] Filed: Apr. 9, 1992

[30] Foreign Application Priority Data

Apr. 10, 1991 [JP] Japan .................................... 3-77636

[51] Int. Cl.$^5$ ........................ C09D 11/02; C09B 69/04
[52] U.S. Cl. ................................. 106/22 K; 8/681;
534/727; 534/588; 534/589
[58] Field of Search ............... 106/22 K; 8/680, 681;
534/727, 588, 589, 603, 728

[56] References Cited

U.S. PATENT DOCUMENTS

| | | | |
|---|---|---|---|
| 3,994,872 | 11/1976 | Kuster | 106/22 K |
| 4,286,989 | 9/1981 | Kadehjian et al. | 106/22 K |
| 4,432,900 | 2/1984 | Pociluyko | 106/22 K |
| 4,605,442 | 8/1986 | Kawashita et al. | 106/22 K |
| 4,940,783 | 7/1990 | Stingelin | 106/22 K |
| 5,034,058 | 7/1991 | Akiyama et al. | 106/22 K |

FOREIGN PATENT DOCUMENTS

| | | |
|---|---|---|
| 469179 | 12/1928 | European Pat. Off. . |
| 533871 | 9/1931 | European Pat. Off. . |
| 0021619 | 1/1981 | European Pat. Off. . |
| 0030389 | 6/1981 | European Pat. Off. . |
| 0049338 | 4/1982 | European Pat. Off. . |
| 0241413 | 10/1987 | European Pat. Off. . |
| 0276534 | 8/1988 | European Pat. Off. . |
| 0347803 | 12/1989 | European Pat. Off. . |
| 1941105 | 2/1971 | Fed. Rep. of Germany . |
| 2006517 | 8/1971 | Fed. Rep. of Germany . |
| 2636608 | 2/1978 | Fed. Rep. of Germany . |
| 1491595 | 11/1977 | United Kingdom . |
| 1511459 | 5/1978 | United Kingdom . |
| 2006801 | 5/1979 | United Kingdom . |
| 2007265 | 5/1979 | United Kingdom . |

*Primary Examiner*—Helene Klemanski
*Attorney, Agent, or Firm*—Birch, Stewart, Kolasch & Birch

[57] ABSTRACT

The present invention provides a novel salt-forming type dye represented by the formula:

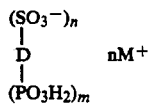

wherein D is a residue of a monoazo or disazo dye, m is an integer of 1 to 3, n is an integer of 1 to 4, and $M^+$ is a cation selected from the group consisting of cations represented by the formulas:

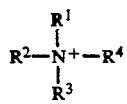

wherein $R^1$, $R^2$, $R^3$ and $R^4$ are the same or different and represent hydrogen, an alkyl group, an alkoxyalkyl group, a cyclohexyl group, an aralkyl group or a hydroxyalkyl group, and at least one of $R^1$ to $R^4$ is a branched or non-branched alkyl, alkoxyalkyl, cycloalkyl, aralkyl or polyoxyalkylene group having not less than 4 carbon atoms,

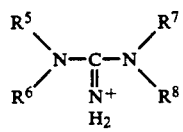

wherein $R^5$, $R^6$, $R^7$ and $R^8$ are the same or different and represent hydrogen, an alkyl group, or a substituted or non-substituted phenyl group, and at least one of $R^5$ to $R^8$ is a substituted or non-substituted phenyl group, and

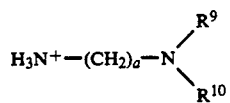

wherein $R^9$ and $R^{10}$ are the same or different and represent hydrogen or an alkyl group, a is an integer of not less than 3, and both $R^9$ and $R^{10}$ are not hydrogen, and a process for producing the same. A concentrated solution composition and an ink composition are also disclosed.

17 Claims, No Drawings

SALT-FORMING TYPE DYE, AND ITS CONCENTRATED SOLUTION COMPOSITION AND INK COMPOSITION

FIELD OF THE INVENTION

The present invention relates to a novel salt-forming type dye and a process for producing the same, and a concentrated solution composition and an ink composition containing the salt-forming type dye. Particularly, it relates to a novel oil-soluble salt-forming type dye which can be used for autograph ink, jet printing ink, stamp ink, printing ink and the like. More particularly, it relates to an azo salt-forming type dye having excellent solubility to a hydrophilic organic solvent (e.g. alcohols, glycols, etc.).

BACKGROUND OF THE INVENTION

Heretofore, as the autographic ink or jet printing ink used for recording on materials to be recorded (e.g. paper, etc.), a solution or dispersion in which various dyes or pigments are dissolved or dispersed has been employed.

A pigment-dispersed type ink has such an advantage that it is superior in durability (e.g. light resistance, etc.). However, dispersion processing in which the pigment is sufficiently dispersed in this ink is required in order to prevent the pigment from precipitating or aggregating with time.

On the other hand, an oil ink or aqueous ink in which the dye is dissolved is advantageously used in comparison with the pigment because no troublesome dispersion processing is required.

However, in this kind of ink or dye concentrated solution, no denaturation or precipitation of the dye with time is required.

As the dye which satisfies such a requirement, for example, a salt-forming type basic and acidic dye, in which a basic dye is treated with a fatty acid, metal complex-containing dye having a water-soluble group (e.g. sulfonic group, etc.), in which an acidic dye is treated with an organic amine and the like are known.

However, a conventional oil ink in which an oil-soluble or alcohol-soluble dye is dissolved in a polar organic solvent is denaturated by environmental change (e.g. temperature, humidity change, etc.). Particularly, it is liable to absorb water in the atmosphere and is inferior in storage stability, which results in deterioration of the quality of the product.

Further, as the method for preparing a liquid composition of an anion type dye (e.g. aqueous ink, recording solution for jet printing, etc.), various methods have been suggested. Among the anion type dye, a direct dye, particularly black dye is generally inferior in water solubility and these dyes have an amino group in a dye molecular structure without exception. Therefore, when a liquid composition of these dyes is stored for a long period of time, deterioration due to oxidation is caused, which results in an increase of viscosity, decrease of concentration and formation of precipitation. Accordingly, the improvement of these disadvantages is desired.

Under these circumstances, the present inventors have studied intensively. As a result, it has been found that, by treating an azo water-soluble dye having a phosphonic acid group and sulfonic acid group in a dye molecular structure with a specific amine, a dye wherein the sulfonic acid group is preferentially or selectively salt-formed can be obtained and the salt-formed dye has excellent solubility to a hydrophilic organic solvent having low toxicity, or to an oil liquid solvent which may contain water, and the present invention has been completed.

OBJECTS OF THE PRESENT INVENTION

One object of the present invention is to provide a novel salt-formed dye having excellent solubility to a hydrophilic organic solvent (e.g. alcohols, glycols, etc.) or hydrophilic organic solvent (hereinafter, sometimes, referred to as "water-containing oil liquid solvent"), and a process for producing the same.

Another object of the present invention is to provide a high concentration liquid composition having excellent storage stability.

Still another object is to provide an aqueous/hydrophilic organic solvent type ink composition which is stable against absorption of water or environmental change.

These objects as well as other objects and advantages of the present invention will become apparent to those skilled in the art from the following description.

SUMMARY OF THE INVENTION

According to the present invention, there is provided a salt-forming type dye represented by the formula:

[wherein D is a residue of a monoazo or disazo dye, m is an integer of 1 to 3, n is an integer of 1 to 4, and $M^+$ is a cation selected from the group consisting of cations represented by the formulas:

(wherein $R^1$, $R^2$, $R^3$ and $R^4$ are the same or different and indicate hydrogen, an alkyl group, an alkoxyalkyl group, a cyclohexyl group, an aralkyl group or a hydroxyalkyl group, and at least one of $R^1$ to $R^4$ is a branched or non-branched alkyl, alkoxyalkyl, cycloalkyl, aralkyl or polyoxyalkylene group having not less than 4 carbon atoms),

(wherein $R^5$, $R^6$, $R^7$ and $R^8$ are the same or different and indicate hydrogen, an alkyl group, or a substituted or non-substituted phenyl group, and at least one of $R^5$ to $R^8$ is a substituted or non-substituted phenyl group) and

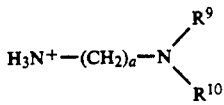

(wherein $R^9$ and $R^{10}$ are the same or different and indicate hydrogen or an alkyl group, a is an integer of not less than 3, and both $R^9$ and $R^{10}$ are not hydrogen)] and a process for producing the same, and a concentrated solution composition and an ink composition containing the salt-forming type dye.

DETAILED EXPLANATION OF THE INVENTION

The salt-forming type dye of the present invention is an amine salt of an azo aqueous dye containing at least a phosphonic acid group and a sulfonic acid group (e.g. monoazo dye or disazo dye selected from an anion type acidic dye or direct dye, etc.). It can also be applied for a polyazo dye (e.g. trisazo dye, etc.), however, solubility to a hydrophilic organic solvent or water-containing oil liquid medium becomes inferior, which results in deterioration of storage stability which is required for the autograph ink or jet printing ink. In the formula [I], numbers of the phosphonic acid group (m) is preferably one in the case of the monoazo dye. When m is not less than 2, water solubility is too large and, therefore, solubility to the organic solvent becomes inferior. In the case of the disazo dye, m is 1 to 3. When m is not less than 4, water solubility is too large and, therefore, solubility to the organic solvent becomes inferior. Numbers of the sulfonic acid group which forms a salt with a cation $M^+$ (n) is 1 to 2 in the case of the monoazo dye. In the case of the disazo dye, n is 1 to 4. When n is not less than 5, oiliness becomes large and, therefore, solubility to the hydrophilic organic solvent or water-containing liquid medium becomes inferior. Preferably, n is 1 to 3. Further, the ratio of numbers of the phosphonic acid group (m) to those of the sulfonic acid group (n) is preferably 2:1 to 1:3.

In the formula [I], the cation $M^+$ is selected from each cation represented by the above formulas [II] to [IV] and it may be also a mixture thereof. As to $R^1$ to $R^4$ in the formula [II], examples of the alkyl group include $C_{1-18}$ alkyl group such as methyl group, ethyl group, propyl group, amyl group, hexyl group, octyl group, nonyl group, dodecyl group, cetyl group, stearyl group, cyclohexyl group and the like. Examples of the alkoxyalkyl group generally contains 4 to 11 carbon atoms, including 3-methoxypropyl group, 3-ethoxypropyl group, 3-butoxypropyl group, 3-octoxypropyl group, 3-(2-ethylhexyl)propyl group and the like, and examples of polyoxyalkylene group include $-(CH_2CH_2O)_{2-6}-H$, $-[CH_2-CH(CH_3)-O]_{2-5}-H$ and the like. Examples of the aralkyl group include benzyl group, α,α-dimethylbenzyl group and the like. Examples of the hydroxyalkyl group generally contains 2-4 carbon atoms, including 2-hydroxyethyl group, 3-hydroxypropyl group, 4-hydroxybutyl group, 2-hydroxypropyl group and the like. $R^1$ to $R^4$ are the same or different and are selected from these groups and H. Among $R^1$ to $R^4$, at least one is a branched or non-branched alkyl, alkoxyalkyl, cyclohexyl, aralkyl or polyoxyalkylene group having not less than 4, preferably 5 to 12 carbon atoms.

In formula [III], $R^5$ to $R^8$ are the same or different and represent hydrogen, an alkyl group, or a substituted or unsubstituted phenyl group. Examples of the alkyl group include those described as to the above $R^1 R^4$. As the substituted or non-substituted phenyl group, for example, there is a $C_{6-8}$ phenyl group and examples thereof include phenyl group, tolyl group, xylyl group and the like. Among $R^5$ to $R^8$, at least one is a substituted or non-substituted phenyl group.

As to $R^9$ and $R^{10}$ in the formula [IV], examples of the alkyl group include those described as to the above $R^1$ to $R^4$. $R^9$ and $R^{10}$ are the same or different and are selected from the above alkyl groups preferably having to 1 to 18 carbon atoms and H, however, both of them are not H. In addition, a is an integer of not less than 3, preferably 3 to 6.

The salt-forming type dye [I] of the present invention is produced by reacting an azo water-soluble dye represented by the formula:

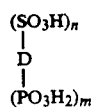

[wherein D, m and n are as defined above] with a catiou forming agent selected from the group consisting of the compounds represented by the formulas:

$$M^+ \cdot Y^- \qquad [VI]$$

[wherein $Y^-$ is an inorganic or organic anion, and $M^+$ is as defined above],

[wherein $R^1$ to $R^3$ are as defined above],

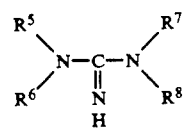

[wherein $R^5$ to $R^8$ are as defined above], and

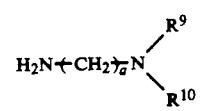

[wherein $R^9$, $R^{10}$ and a are as defined above].

In the formula [VI], $Y^-$ is an inorganic or organic anion. Examples thereof include anion species in an inorganic acid salt (e.g. $Cl^-$, $Br^-$, $I^-$, $SO_4^{2-}$, etc.) and anion species in an organic acid salt (e.g. $HCO_2^-$, $CH_3CO_2^-$, etc.). As the cation forming agent [VI], for example, there are those in which the compounds [VII] to [IX] as the other cation forming agent described below are neutralized with a corresponding inorganic or organic acid, or quaternized with a corresponding quaternizing agent (e.g. alkylating agent, etc.) and the like.

Examples of the compound [VII] to [IX] as the other cation forming agent include aliphatic amine (e.g. dibutylamine, di-iso-butylamine, di-sec-butylamine, di-tertbutylamine, n-, iso-, sec-, tert-amylamine, hexylamine, pentylamine, octylamine, 2-ethylhexylamine, di-(2-ethylhexyl)amine, dodecylamine, etc.), alycyclic amine (e.g. cyclohexylamine, di-cyclohexylamine, etc.), alkoxyalkylamine (e.g. 3-ethoxypropylamine, di-(3-ethoxypropyl)amine, 3-butoxypropylamine, octoxypropylamine, 3-(2-ethylhexyloxy)propylamine, etc-.), alkanol group-containing amine (e.g. N-cyclohexylethanolamine, N-dodecylimino-di-ethanol, etc.), diamine (e.g. dimethylaminopropylamine, dibutylaminopropylamine, etc.), guanidine (e.g. 1,3-diphenylguanidine, 1-o-tolylguanidine, di-o-tolylguanidine, etc.), alkylene oxide addition amine having a molecular weight of 200 to 300 (e.g. ethylene oxide addition amine, long chain alkyl substituted-ethylene oxide addition amine, etc.). One or more kinds of them may be used.

The above cation forming agent [VI] to [IX] may be preferably those which are low-volatile and contain one or more substituents having not less than 4 (particularly not less than 5) carbon atoms, a boiling point of which is not less than 100° C. When using a high-volatile cation forming agent, the resulting salt-forming type dye has not sufficient lipophilic nature, and it is not preferred.

In the reaction of the azo water-soluble dye with the cation forming agent, if necessary, other additives (e.g. urea, inorganic salts, etc.) may be added.

The reaction ratio of the azo water-soluble dye [VI] to the cation forming agent may be a stoihiometric amount, substantially. For example, the amount of the cation forming agent may be n to n+1 moles based on 1 mole of the azo water soluble dye. The reaction may be conducted by a normal method, for example, by mixing the azo water soluble dye [V] with the cation forming agent with stirring at 0° to 40° C. for 2 to 5 hours. Then, the mixture is subjected to a normal after-treatment [e.g. pH is adjusted to weak acidic (pH 4 to 7)], filtered, washed and dried to obtain a salt-forming type dye [I] of the present invention.

In the present invention, by using the above salt-forming type dye [I] thus obtained, it's concentrated solution composition, that is, a concentrated solution composition containing 15 to 35 % by weight of a salt-forming type dye and 75 to 85% by weight of a hydrophilic organic solvent or a hydrophilic organic solvent having a water content of not more than 50% can be prepared. As the hydrophilic organic solvent which can be used in the concentrated solution composition of the present invention, for example, there are monovalent alcohol (e.g. lower alcohol such as ethanol, n-propyl alcohol, iso-propanol, n-butanol, etc. and diacetone alcohol; monoalkyl ether of diol such as ethylene glycol monomethyl ether, ethylene glycol monoethyl ether, propylene glycol monoethyl ether, diethylene glycol monoethyl ether, diethylene glycol monobutyl ether, dipropylene glycol monoethyl ether, etc.; monoacetate of diol such as ethylene glycol monoacetate, propylene glycol monoacetate, etc.; benzyl alcohol; cyclohexanol, etc.), divalent alcohol (e.g. glycols such as ethylene glycol, diethylene glycol, trimethylene glycol, triethylene glycol, tetraethylene glycol, polyethylene glycol, propylene glycol, butanediol, etc.), trivalent alcohol (e.g. glycerine, trimethylolpropane, 1,2,6-hexanetriol, etc.). As the other hydrophilic organic solvent, for example, there are dioxane, 2-pyrrolidone, methyl lactate, ethyl lactate, butyl lactate and the like and one or more kinds of them can be used. Preferably, low toxic or non-toxic ethanol, propanol, propylene glycol monoalkyl ether, lactic ester and the like may be used.

Further, the above hydrophilic organic solvent may contain water. The water content is not more than 50% by weight, preferably 20% by weight. When the water content exceeds 50% by weight, solubility and stability with time are deteriorated, and it is not preferred.

The salt-forming type dye represented by the formula [I] is dissolved in the above hydrophilic organic solvent and the solution is filtered, and then the dye concentration is adjusted to 15 to 35% by weight to obtain a concentrated solution composition of the present invention. In this case, if necessary, additives (e.g. antiseptics, nonionic surfactant, etc.) may be added in a small amount.

In the concentrated solution composition of the present invention, pH adjustment is not particularly required and it is possible to store at a neutral state for a long period of time. Further, when pH is adjusted to 8 or more (e.g. with sodium hydroxide, lithium hydroxide, etc.), the cation forming agent is liberated, and it is not preferred.

Further, in the present invention, the ink composition containing the-salt-forming type dye represented by the formula [I] of the present invention can be prepared. It is preferred that the ink composition of the present invention contains 1 to 30% by weight of a salt-forming type dye [I] of the present invention, not less than 60% by weight of a hydrophilic organic solvent which may contain water described above and 5 to 10% by weight of a resin, based on the total weight of the ink composition. The amount of the salt-forming type dye [I] varies depending on the application of the ink and is not specifically limited, and it may be 15 to 25% by weight for a ball point pen, 5 to 15% by weight for marking pen and 3 to 10% by weight for ink-jet recording.

Further, by using-the above concentrated solution composition of the present-invention and, if necessary, adjusting the concentration to obtain the ink composition of the present invention.

The resin which can be suitably used in the ink composition of the present invention may be those which are normally used in the ink composition, for example, a water-soluble or alcohol-soluble resins. Examples thereof include lower condensate of vinyl pyrrolidone, water-soluble alkyd resin, water-soluble acrylic resin, alcohol-soluble phenol resin, acrylic resin, styrene maleic resin, ketone resin and the like.

As is described above, the salt-forming type dye of the present invention has the following advantages:

(1) Since it has a free phosphonic acid group, the affinity to a hydrophilic organic solvent and a water-containing oil solution solvent is large;

(2) Since a water-soluble sulfonic acid group forms a salt with specific amine, the lipophilic nature is enhanced, which results in remarkable improvement of solubility to a hydrophilic organic solvent (e.g. alcohols, glycols, etc.); and (3) Since the balance between a phosphonic acid group and amine sulfonate salt in a dye molecular structure is excellent, it is superior in matching with a water-containing oil solution solvent.

Further, the concentrated solution composition and ink composition of the present invention also has the following advantages:

(1) They show surprisingly high solubility to a solution solvent wherein the ratio of water to hydrophilic organic solvent is not more than 1 and are superior in storage stability;

(2) The dye is not denatured or precipitated according to environmental change (e.g. temperature, humidity change, etc.) and they are superior in stability with time;

(3) Since they are superior in solubility to a neutral solution solvent, corrosion of a vessel at the part contacting with the solution is not arisen; and (4) Since a low toxic organic solvent can be used, they are superior in stability to a human body.

The following Examples and Comparative Examples further illustrate the present invention in detail but are not construed to limit the scope thereof. In the Examples and Comparative Examples, all "parts" are by weight unless otherwise stated.

EXAMPLE 1

Production of Salt-Forming Type Dye

3-Aminophenylphosphonic acid (17.3 parts) was diazotized by a conventional method and this was added to an aqueous alkali solution of 1,7-Cleve's acid (22.3 parts), followed by coupling at pH 8 to 9. The mixture was subjected to an acid salting-out treatment to precipitate a monoazo compound, which was dispersed in aqueous hydrochloric acid to diazotize it at 30° to 40° C. Then, this diazo solution was added to a sodium carbonate alkali solution of 2R acid (2-amino-8-naphthol-3,6-disulphonic acid, 34 parts), followed by coupling at pH 8.5 to 9.0 and further precision filtration. To this was added 1,3-diphenylguanidine (60 parts) dissolved in aqueous acetic acid and the mixture was stirred at 0° to 50° C. for 2 hours, and pH was adjusted to weak acidic. Then, it was filtered, washed and dried to obtain a black dye (Black No.4, 65 parts) shown in Table 1. Further, its solubility is also shown in Table 1. In Table 1, P is —PO(OH)$_2$, S is —SO$_3^-$ and a cation M$^+$ which forms a salt with —SO$_3^-$ is shown in the form of free amine. It is the same with FIGS. 2 and 3.

EXAMPLES 2 TO 8

According to the same manner as that described in Example 1 except that the water-soluble dye (Black No.4) and 1,3-diphenylguanidine of Example 1 were respectively changed to the water-soluble dye and amine shown in Table 1, black salt-forming type dyes of Black Nos.1 to 3 (Examples 2 to 4) and Nos.5 to 8 (Examples 5 to 8) were obtained.

EXAMPLE 9

3-Aminophenylphosphonic acid (17.3 parts) was diazotized by a conventional method and this was added to an aqueous alkali solution of aniline-ω-sulfonic acid (21 parts), followed by coupling. By adjusting the pH to strong alkali, —NHCH$_2$SO$_3$Na was changed to an amino group. The mixture was subjected to an- acid salting-out treatment to precipitate a monoazo compound, which was dispersed in aqueous hydrochloric acid to diazotize it at 10° to 20° C. Then, this diazo solution was added to a sodium carbonate alkali solution of G acid (2-naphthol-6,8-disulfonic acid, 33 parts), followed by coupling at pH 8 to 8.5 and further precision filtration. To this was added di-(2-ethylhexyl)amine (48 parts) and the mixture was stirred at 10° to 20° C. for 3 hours, and pH was adjusted to weak acidic. Then, it was filtered, washed and dried to obtain a red dye (Red No.1, 70 parts) shown in Table 2 described below.

EXAMPLES 10 TO 12

According to the same manner as that described in Example 9 except that the water soluble dye (Red No.1) and di-(2-ethylhexyl)amine were respectively changed to the water-soluble dye and amine shown in Table 2 described below, red salt-forming type dyes of Red Nos.2 to 4 (Examples 10 to 12) were obtained.

EXAMPLE 13

3-Aminophenylphosphonic acid (17.3 parts) was diazotized by a conventional method and this was added to an aqueous alkali solution of 1-amino-7-naphthol (16 parts), followed by acidic coupling at pH 3.5 to 4.0. A monoazo compound was precipitated and dispersed in aqueous hydrochloric acid to diazotize it at 5° to 15° C. Then, this diazo solution was added to an sodium carbonate alkali solution of H acid (1-amino-8-naphthol-3,6-disulfonic acid, 34 parts), followed by coupling at pH 8.5 to 9.0 and further precision filtration. To this was added polyoxydodecylamine (48 parts) dissolved in aqueous hydrochloric acid and the mixture was stirred at 0° to 5° C. for 3 hours, and pH was adjusted to weak acidic. Then, it was filtered, washed and dried under vacuum to obtain a blue dye (Blue No.2, 80 parts) shown in Table 3 described below.

EXAMPLES 14 AND 15

According to the same manner as that described in Example 13 except that the water-soluble dye and polyoxydodecylamine of Example 13 were respectively changed to the water-soluble dye and amine shown in Table 3, blue salt-forming type dyes of Blue Nos.1 and 3 (Examples 14 and 15) were obtained.

COMPARATIVE EXAMPLE 1

3-Aminophenylphosphonic acid (17.3 parts, 0.1 moles) was diazotized by a conventional method and this was added to an aqueous alkali solution of 1-phenyl-3-methyl-5-pyrazolone (17.4 g, 0.1 moles), followed by coupling at pH 8 to 9. Then, pH was adjusted to 9 to 10 and a monoazo compound was completely dissolved, followed by precision filtration. To this was added 1,3-diphenylguanidine (21 g) dissolved in aqueous acetic acid and the mixture was stirred at 10° to 20° C. for 2 hours, and pH was adjusted to weak acidic. Then, it was filtered, washed and dried to obtain a dye (Comparative Example No.1) shown in Table 4. Yield was measured and, as a result, it was 30 g. Yield of this product corresponded to a chemical equivalent of a monoazo compound before salt-forming.

COMPARATIVE EXAMPLE 2

According to the same manner as that described in Comparative Example 1 except that 3-aminophenylphosphonic acid (17.3 g, 0.1 moles) used in Comparative Example 1 was changed to metanilic acid (16.7 g, 0.1 moles), 50 g of a yellow dye of Comparative Example No.2 was obtained. Yield of this product corresponded to a chemical equivalent of a salt-formed monoazo compound.

COMPARATIVE EXAMPLES 3 TO 8

According to the same manner as that described in Comparative Example 1 except that the diazo component (3-aminophenylphosphonic acid,- metanilic acid) and coupling component (1-phenyl-3-methyl-5-pyrazolone) used in Comparative Example 1 or 2 were respectively changed to the others, dyes of Comparative Example Nos. 3 to 8 (Comparative Examples 3 to 8) were obtained.

Solubility of each dye of the above Comparative Examples is shown in Table 4, respectively.

EXAMPLE 16

Concentrated Solution Composition of the Present Invention

A salt-forming type dye (No.4, 30 parts) of the present invention was uniformly mixed and dissolved in propylene glycol (70 parts) at 40° C., followed by precision filtration to prepare a black solution composition having a dye concentration of 30%. This solution composition (30 ml) was placed in a 50 ml glass sampler and stability with time of the solution composition was examined by an incubator (manufactured by Sanyo Denki K.K.). A test was conducted at a temperature range between −5° and 50° C. and a repeating time of 60 minutes for 3 months and, as a result, no precipitation and denaturation of the dye were observed.

EXAMPLE 17

| Components | Amounts (parts) |
|---|---|
| Deionized water | 10 |
| Propylene glycol | 70 |
| Salt-forming type dye of the present invention (Red No. 1) | 20 |
| Antiseptics | 0.1 |

By uniformly mixing and dissolving the above components at 40° C., a red solution composition having a dye concentration of 20% was prepared according to the same manner as that described in Example 16. Stability with time was examined and, as a result, no precipitation of the dye was observed, as is the same as Example 16.

EXAMPLE 18

| Components | Amounts (parts) |
|---|---|
| Deionized water | 10 |
| Ethyl alcohol | 40 |
| Propylene glycol monoethyl ether | 30 |
| Salt-forming type dye of the present invention (Black No. 4) | 15 |
| Low polymerization vinyl pyrrolidone resin | 5 |

The above components were uniformly mixed and dissolved at 60° C., followed by precision filtration to obtain a black ink composition. According to the same manner as that described in Example 16, stability with time was examined. As a result, no precipitation of the dye was observed.

EXAMPLES 19 TO 33

According to the same manner as that described in Example 18, each ink composition (Examples 19 to 33) of the present invention having a formulation shown in Table 5 was prepared, respectively. These ink compositions were stable for at least 3 months and no precipitation was observed.

TABLE 1

(Black dye)

| Black | Structural formula (Water-soluble dye) | Amine (M) | Solubility (g/100 ml) | | |
|---|---|---|---|---|---|
| | | | Ethanol | Glycol ether | Water:Solvent = 2:8 |
| No. 1 | [structure with OCH₃, CH₃, OH, NH₂, S, P groups] | 3-Ethoxypropylamine | 3 | 10 | 15 |
| No. 2 | [structure with OCH₃, CH₃, OH, NH₂, S, P groups] | Octoxypropylamine | 5 | 15 | 10 |
| No. 3 | [structure with OH, NH₂, S, P, S groups] | Cyclohexylamine | 5 | 30 | 20 |
| No. 4 | [structure with OH, NH₂, S, P, S groups] | 1,3-diphenylguanidine | 5 | 30 | 30 |

TABLE 1-continued
(Black dye)

| Black | Structural formula (Water-soluble dye) | Amine (M) | Solubility (g/100 ml) Ethanol | Glycol ether | Water:Solvent = 2:8 |
|---|---|---|---|---|---|
| No. 5 | [structure] | Polyoxydodecylamine | 10 | 30 | 10 |
| No. 6 | [structure] | Dicyclohexylamine | 10 | 15 | 10 |
| No. 7 | [structure] | 2-Ethylhexylamine | 3 | 20 | 30 |
| No. 8 | [structure] | Octoxypropylamine | 8 | 30 | 20 |

TABLE 2
(Red dye)

| Red | Structural formula (Water-soluble dye) | Amine (M) | Solubility (g/100 ml) Ethanol | Glycol ether | Water:Solvent = 2:8 |
|---|---|---|---|---|---|
| No. 1 | [structure] | Di-2-ethylhexylamine | 10 | 20 | 30 |
| No. 2 | [structure] | 3-Butoxypropylamine | 8 | 25 | 30 |
| No. 3 | [structure] | N-cyclohexylethanolamine | 5 | 25 | 30 |

TABLE 2-continued

(Red dye)

| Red | Structural formula (Water-soluble dye) | Amine (M) | Solubility (g/100 ml) Ethanol | Glycol ether | Water:Solvent = 2:8 |
|---|---|---|---|---|---|
| No. 4 | 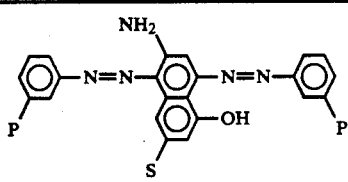 | Dimethylaminopropylamine | 3 | 30 | 30 |

TABLE 3

(Blue dye)

| Blue | Structural formula (Water-soluble dye) | Amine (M) | Solubility (g/100 ml) Ethanol | Glycol ether | Water:Solvent = 2:8 |
|---|---|---|---|---|---|
| No. 1 | 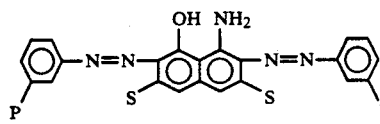 | L-amylamine | 3 | 25 | 30 |
| No. 2 | 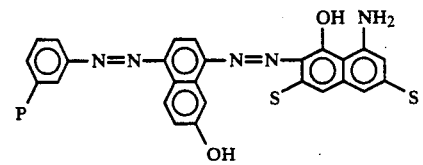 | Polyoxydodecylamine | 5 | 25 | 30 |
| No. 3 | 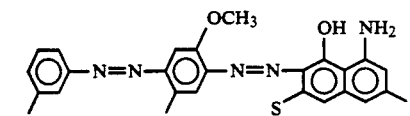 | 1-O-tolylguanidine | 10 | 30 | 25 |

TABLE 4

| Comp. Ex. | Structural formula | Solubility *1) Water | Lower alcohol | Glycol ether | Water:Solvent = 2:8 |
|---|---|---|---|---|---|
| No. 1 | 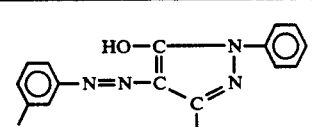 | D | D | C | C |
| No. 2 | 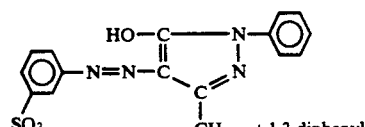 +1,3-diphenylguanidine | D | C | B | C |
| No. 3 | 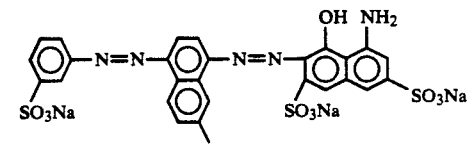 | A | D | D | C |

TABLE 4-continued

| Comp. Ex. | Structural formula | Solubility *1) | | | |
|---|---|---|---|---|---|
| | | Water | Lower alcohol | Glycol ether | Water:Solvent = 2:8 |
| No. 4 | [structure with PO(ONH$_4$)$_2$, N=N, H$_4$NO$_3$S, OH, SO$_3$NH$_4$] | A | D | C | C |
| No. 5 | [structure with PO(ONa)$_2$, N=N, SO$_3$Na, OH, NH$_2$, SO$_3$Na, SO$_3$Na] | A | D | C | D |
| No. 6 | [structure with PO(OH)$_2$, N=N, SO$_3^-$, OH, NH$_2$, SO$_3^-$, SO$_3^-$ + 3H$_2$N-CH(CH$_2$CH$_3$)$_2$] | C | C | B | C |
| No. 7 | [structure with PO(ONa)$_2$, N=N, SO$_3$Na, OH, NHCOCH$_3$, SO$_3$Na] | A | D | D | C |
| No. 8 | [structure with SO$_3^-$, N=N, SO$_3^-$, OH, NH$_2$, SO$_3^-$ + 3NH$_3$C$_{12}$H$_{25}$] | D | C | B | D |

*1) Evaluation:
A: dissolved in an amount of 10% or more
B: dissolved in an amount of 5~10%
C: dissolved in an amount of 5% or less
D: dissolved in an amount of 1% or less

TABLE 5

| Example No. | Salt-formed dye | | Water | Water-soluble organic solvent | | | | Resin | |
|---|---|---|---|---|---|---|---|---|---|
| | | | | Alcohol | | Glycols, etc. | | | |
| 19 | Black No. 1 | 10 | 10 | Ethanol | 40 | PME | 30 | Low polymerization vinyl pyrrolidone | 10 |
| 20 | Black No. 2 | 10 | 10 | Ethanol | 50 | Ethyl lactate | 20 | Acrylic resin | 10 |
| 21 | Black No. 3 | 15 | 10 | Ethanol | 10 | PME | 57 | Arakyd resin | 8 |
| 22 | Black No. 4 | 20 | 5 | Ethanol | 65 | — | — | Low polymerization vinyl pyrrolidone | 10 |
| 23 | Black No. 5 | 20 | 10 | — | — | PG | 62 | Low polymerization vinyl pyrrolidone | 8 |
| 24 | Black No. 6 | 12 | — | Ethanol | 18 | PME | 60 | Phenol resin | 10 |
| 25 | Black No. 7 | 5 | 20 | — | — | DEG | 70 | Low polymerization vinyl pyrrolidone | 5 |
| 26 | Black No. 8 | 15 | — | Ethanol | 65 | Ethyl lactate | 10 | Ketone resin | 10 |
| 27 | Red No. 1 | 8 | — | Ethanol | 70 | Ethyl lactate | 14 | Phenol resin | 8 |
| 28 | Red No. 2 | 10 | 10 | Ethanol | 25 | PME | 50 | Acrylic resin | 5 |
| 29 | Red No. 3 | 8 | 15 | — | — | DEG | 69 | Low polymerization vinyl pyrrolidone | 8 |
| 30 | Red No. 4 | 8 | 10 | — | — | PG | 77 | Arakyd resin | 5 |
| 31 | Blue No. 1 | 7 | 5 | Ethanol | 13 | PME | 70 | Acrylic resin | 5 |
| 32 | Blue No. 2 | 7 | — | Ethanol | 70 | Ethyl lactate | 15 | Ketone resin | 8 |
| 33 | Blue No. 3 | 8 | 10 | — | — | PG | 74 | Low polymerization vinyl pyrrolidone | 8 |

Unit: % by weight
PME: Propylene glycol monomethyl ether
PG: Propylene glycol
DEG: Diethylene glycol

What is claimed is:

1. A salt-forming dye having excellent solubility to hydrophilic organic solvent represented by the formula:

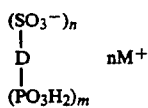  (I)

wherein D is a residue of a monoazo or disazo dye, m is an integer of 1 to 3, n is an integer of 1 to 4, and M+ is a cation selected from the group consisting of cations represented by formulas (II), (III), (IV) and mixtures thereof:

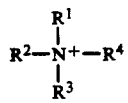  (II)

wherein $R^1$, $R^2$, $R^3$ and $R^4$ are the same or different and represent hydrogen, an-alkyl group, an alkoxyalkyl group, a cyclohexy group, an aralkyl group or a hydroxyalkyl group, and at least one of $R^1$ to $R^4$ is a branched or non-branched alkyl, alkoxyalkyl, cycloalkyl, aralkyl or polyoxyalkylene group having not less than 4 carbon atoms,

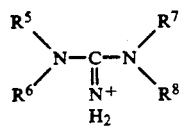  (III)

wherein $R^5$, $R^6$, $R^7$ and $R^8$ are the same or different and represent hydrogen, an alkyl group, or a substituted or non-substituted phenyl group, and at least one of $R^5$ to $R^8$ is a substituted or non-substituted phenyl group, and

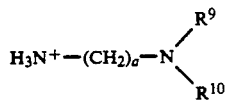  (IV)

wherein $R^9$ and $R^{10}$ are the same or different and represent hydrogen or an alkyl group, a is an integer of not less than 3, and both $R^9$ and $R^{10}$ are not hydrogen.

2. A process for producing the salt-forming dye according to claim 1, which comprises reacting a compound represented by the formula:

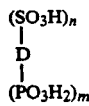  (V)

wherein D, m and n are as defined above, with a cation forming agent selected from the group consisting of the compounds represented by the formulas:

  (VI)

wherein $Y^-$ is an inorganic or organic anion, and $M^+$ is as defined above,

  (VII)

wherein $R^1$ to $R^3$ are as defined above,

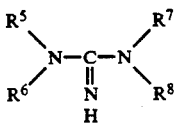  (VIII)

wherein $R^5$ to $R^8$ are as defined above, and

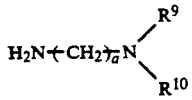  (IX)

wherein $R^9$, $R^{10}$ and a are as defined above.

3. A concentrated solution composition which comprises:
15 to 35% by weight of the salt-forming dye according to claim 1, and
75 to 85% by weight of a hydrophilic organic solvent or a hydrophilic solvent having a waste content of not more than 50% by weight.

4. An ink composition which comprises the salt-forming dye according to claim 1, a hydrophilic organic solvent or a hydrophilic organic solvent having a water content of not more than 50% by weight, and a resin.

5. The concentrated solution composition according to claim 3, wherein the hydrophilic organic solvent is selected from the group consisting of alcohols, glycols and lactic esters.

6. The ink composition according to claim 4, wherein the hydrophilic organic solvent is selected from the group consisting of alcohols, glycols and lactic esters.

7. The ink composition which comprises the concentrated solution composition according to claim 3 or 5.

8. The dye according to claim 1, wherein $R^1$ to $R^4$ in formula (ii) is an alkyl group having 1-18 carbon atoms.

9. The dye according to claim 1, wherein $R^1$ to $R^4$ in formula (II) is an alkoxyalkyl group having 4 to 11 carbon atoms.

10. The dye according to claim 1, wherein $R^1$ to $R^4$ in formula (II) is an hydroxyalkyl group having 2 to 4 carbon atoms.

11. The dye according to claim 1, wherein at least one of $R^1$ to $R^4$ in formula (II) is a branched or non-branched alkyl, alkoxyalkyl, cyclohexyl, aralkyl or polyoxyalkylene group having not less than 5 to 12 carbon atoms.

12. The dye according to claim 1, wherein $R^5$, $R^6$, $R^7$ or $R^8$ in formula (III) is a substituted or unsubstituted phenyl group having 6 to 8 carbon atoms.

13. The dye according to claim 1, wherein $R^9$ and $R^{10}$ in formula (IV) are the same or different and are selected from the group consisting of an alkyl group having 1 to 18 carbon atoms and hydrogen, with the proviso that both $R^9$ and $R^{10}$ are not hydrogen.

14. The dye according to claim 1, wherein a is an integer of 3 to 6.

15. The process according to claim 2, wherein compounds (VII) to (IX) are selected from the group consisting of an aliphatic amine, an alycyclic amine, an alkoxyalkylamine, an alkanol group-containing amine, diamine, guanidine, an alkylene oxide addition amine having a molecular weight of 200 to 300, and combinations thereof.

16. The composition according to claim 3, wherein the hydrophilic organic solvent is selected from the group consisting of a monovalent alcohol, a divalent alcohol and a trivalent alcohol.

17. The ink composition according to claim 4, which comprises 1 to 30% by weight of the salt-forming dye, not less than 60% by weight of the hydrophilic organic solvent having a water content of not more than 50% by weight, and 5 to 10% by weight of the resin.

* * * * *